Patented Feb. 25, 1947

2,416,485

UNITED STATES PATENT OFFICE 2,416,485

RESINOUS MATERIAL

Edward A. Lasher, Los Angeles, Calif., assignor to California Flaxseed Products Company, Los Angeles, Calif., a corporation of California No Drawing. Application March 31, 1942, Serial No. 437,022

11 Claims. (Cl. 260—405)

This invention relates to a new synthetic resinous material and in particular to the interaction products resulting from heating hydroxylated oils with certain aliphatic acids including the hydroxy polybasic acids.

In general the object of my invention is to provide resin materials insoluble in aromatic and aliphatic hydrocarbon solvents and having stability against change in consistency with time under conditions of use. A further object is to provide a method for the partial esterification of hydroxylated oils including "blown" vegetable and fish oils, with certain aliphatic acids, to produce resinous materials.

I have found that hydroxylated oils may be caused to react with hydroxy polybasic aliphatic acids such as citric, malic and tartaric to form esters, and when the proportions and duration of the reaction are controlled so that only a portion of the available acid (carboxyl) groups are esterified by the hydroxyl groups of the oil, resinous products are formed which are stable over long periods of time, are quite insoluble in hydrocarbon solvents, and which have other useful properties as noted herein.

The term "hydroxylated oils" includes the natural oils which have free hydroxyl groups, for example raw castor oil, and also the oils which are obtained by "blowing" certain oils (those having unsaturated carbon bonds) for example, castor oil, linseed oil, rape oil, sardine oil, etc. It is well known that "blowing" causes an increase in the hydroxyl group content over that of the original oil, as evidenced and usually measured by the increase in the "acetyl number." "Blowing" also produces a marked increase in the viscosity of the oil, and viscosity increase is an approximate measure of the amount of blowing and hence of the increase in hydroxy group content. Oils which have been otherwise treated to increase their hydroxyl content may be used. I prefer to use blown castor oil in producing my resins because of its availability, high viscosity, and reactivity in the esterification reaction.

Example I

The partial esterification reaction of blown castor oil with hydroxy polybasic aliphatic acids may be carried out by heating the ingredients in proper proportions to a temperature of about 400° F.

Parts by weight
Blown castor oil _____ 20
Citric acid _____ 11

The ingredients were mixed and heated to about 400° F. raising the temperature gradually over a period of one and one-half hours, and then holding it at the maximum temperature for a few minutes. Water vapor was given off during the heating due to the esterification reaction. A homogeneous viscous resinous product resulted, which is strongly tacky, somewhat elastic, non-hygroscopic, and non-drying. It is not dissolved nor swelled appreciably by either aliphatic or aromatic hydrocarbons.

Raw castor oil and also blown linseed oil were substituted for the blown castor oil in Example 1, and the products were similar, although higher or longer maximum temperatures were required to get the same consistencies.

Malic acid may be used in place of the citric acid in the above compositions, and substantially the same type resins result. Tartaric acid may be similarly esterified with blown castor oil and its equivalent oils to give similar products, but it is more difficult to produce a homogeneous product.

The term "polybasic acid" as used in these specifications and claims is meant to include those acids having two or more active carboxyl groups; and the term "hydroxy" is used to include one or more active hydroxyl groups.

By replacing a part of the hydroxy polybasic acid with a hydroxy monobasic aliphatic acid such as lactic acid, the partial inter-esterification resins have improved stability, and if made under the same conditions of reaction, the resin is softer than where the hydroxy polybasic acids alone are used.

Example II

Blown castor oil (Saybolt 210° viscosity, 285)
    parts by weight__ 120
Citric acid _____ parts__ 72
Lactic acid (water free basis) _____ do ____ 38

The ingredients were mixed and heated to 280° F. during the first hour; from 280 to 320° F. in the second hour; from 20 to 360° F. in the third hour; and held at 360° F. for approximately one-half hour or until the acid number was about 230. The resin product is of heavy consistency, stable in consistency over long periods of time, non-drying, non-hygroscopic, strongly tacky, and not appreciably soluble in any type gasoline. The proportions of citric acid or equivalent acid may be varied to give the desired properties in the resin product. The ratio of 8 citric acid to 5 lactic acid gives a product of maximum insolubility in aviation gasoline. A higher proportion of lactic acid than that given in Example II gives a resin of appreciably lower resistance to hydrocarbon solvents and one of lower stability, while a lower proportion gives a more viscous resin. In these specifications the term "stability" means the property of the resin product to maintain its initial physical state when kept at normal or operating temperatures for a long time. Stability in these products is usually comparatively measured by an accelerated test which involves holding the product at temperatures of 212° F. and measuring the time during which the material maintains its original condition, and does not become hard or brittle.

Blown linseed oil was used in place of the blown castor oil used in Example II, and gave a similar product.

*Example III*

Blown linseed oil (Saybolt 210° viscosity, 285)
parts by weight__ 120
Citric acid_____parts__ 72
Lactic acid (water free basis)_____do____ 38

The mixed ingredients were heated slowly to a temperature of about 500° F. and held there for 10 to 15 minutes. It is necessary to use this high temperature in order to get a uniform product. The resin was insoluble in aliphatic hydrocarbons but in contrast to the product of Example II, was relatively soluble in benzol. The product was also softer.

*Example IV*

Raw castor oil may also be used in place of the blown castor oil of Example II, but a higher temperature and a longer time, about two hours, was required to get a similar product, with the same proportions of ingredients.

The consistency, insolubility, and other properties may be varied by changes in the proportions of hydroxylated oil to acids, by varying the rate of heating, by varying the completeness of the esterification reaction as measured by the acid number, and by using blown oil having different degrees of "blowing," i. e., different degrees of hydroxylation.

In the case of blown castor oil (of Saybolt 210° viscosity, 285) the proportion of oil to acid or acids may be varied from a ratio of about 2 parts oil to one of acids, to a ratio of 1 part oil to two of acids. In general the higher the proportion of acid, the greater is the viscosity of the product and the lower is the hydrocarbon solubility, the stability, and the resistance to water.

The rate of heating effects the characteristics of the product, probably by determining the positions in the molecular structures at which esterification reaction takes place, and in what order. In general relatively slow heating produces the products having greatest insolubility in hydrocarbons.

The completeness of the esterification reaction determines to a considerable extent the properties of the ester product. The completeness of esterification is measured by the acid number of the product, because in all of my resins there is an excess of reactive carboxyl groups. The reaction product from a given composition such as Example II, if the reaction is allowed to proceed to an acid number of 175, has a definitely higher viscosity than the same initial mixture if allowed to react to an acid number of 230. The solubility in gasolines containing aromatic hydrocarbons is least where the esterification is not as complete as it can be carried by prolonged heating at higher temperatures, and hence for the resins to be most resistant to aromatic and aliphatic hydrocarbons, the reaction is carried only to the point where the acid number is about 225. Resins having lower acid numbers are more viscous, i. e., approach a solid jell state. It is probable that in addition to the inter-esterification reaction of the hydroxyl and acid groups, there is also some polymerization into still larger molecules, particularly at the higher temperatures.

Blown castor oil varies in viscosity from an original Saybolt 210° viscosity of about 100 for prime cold pressed raw oil to 1600 or more in the highest blown oil. It is believed that the capacity of the blown oils to form partial esterification products with aliphatic acids as described above increases with the amount of blowing and consequent hydroxylation, and this is somewhat proportional to the increase in viscosity. Therefore, it will be clear that if more viscous castor oil is used initially, the more complex (structurally) will be the ester resin produced. I have found that, using more highly blown castor oil and citric acid, the products generally are much higher in viscosity when the esterification is carried out to the same acid number, than when lighter blown oil is used. The products, when using highly blown castor oil, approach a solid state where viscosity cannot be measured.

The softness and heat stability of the resins made by interaction of blown castor oil with citric acid as illustrated in Example I, and with mixtures of citric acid and lactic acid as illustrated by Example II, may be improved without serious loss of hydrocarbon insolubility by substitution for part of the citric acid, one of the non-hydroxy dibasic aliphatic acids such as oxalic, malonic, succinic, glutaric, adipic or sebacic acids.

*Example V*

A mixture of 300 parts of blown castor oil (viscosity, Saybolt 210°, 285), 135 parts citric acid, 112 parts lactic acid (85%) and 45 parts adipic acid, was heated to 280° in 30 minutes; from 280 to 320° F. in 30 minutes; from 320 to 400° F. in 75 minutes, and then held at 400° F. for seven minutes. At this time the acid number was 210 and the product was a soft, tacky resin, insoluble in hydrocarbon solvents. It had excellent stability, as determined by the fact that after exposure to a temperature of 212° F. for several days, it did not become brittle nor form a skin.

Rubber-like products may be made from the resin produced as above described, by a second reaction in which further amounts of blown oils are reacted with the resins. Illustrative of this is the following:

*Example VI*

Three parts of the resin produced as described in Example II, above, was slowly heated to 400° F. with one part of blown castor oil (highly blown to almost solid consistency) and held at this temperature for about ten minutes. Further esterification and possibly polymerization takes place, and a jell-like solid having a rubbery consistency with marked cohesiveness was produced. This material has lost most of its tackiness or surface stickiness, and is as insoluble in aromatic and aliphatic hydrocarbons as the resin of Example II.

The resins of my invention are very useful in gasket materials for use between adjoining metal or other surfaces to prevent leaks. For example, when placed between contacting surfaces in seams in gasoline tanks, these resins or compositions made with them as a base prevents leaks by filling cracks, and being tacky and adherent to metal surfaces, as well as having stability of consistency over long periods of time, and in some cases being resistant to the solvent action of mixtures rich in aromatic hydrocarbon solvents, they are an important improvement over any other material for this purpose.

The resins of this invention may also be used to advantage in rubber mixtures, surface coatings, adhesives, plastics, mastic compositions and the like. The properties may be varied over a considerable range, as may be desired for the particular uses, by variations in the proportions and kinds of oils and acids used as well as by variations in processing, as indicated in the illustrations given. The term "acid esters" is applied to these inter-esterification resins of my invention, which are characterized by having relatively high acid numbers, in contrast to normal esters, and by having high stability even though the esterification is carried only partly to completion.

I claim:

1. A resin consisting of an acid inter-estification product of an hydroylated oil, a hydroxy polybasic aliphatic acid, and a hydroxy monobasic aliphatic acid the acid number of said resin being of the order of 200.

2. A resin consisting of an acid inter-esterifification product of blown castor oil, a hydroxy polybasic aliphatic acid, and a hydroxy monobasic aliphatic acid, the acid number of said resin being of the order of 200.

3. A resin consisting of an acid inter-esterification product of blown linseed oil, a hydroxy polybasic aliphatic acid, and a hydroxy monobasic aliphatic acid, the acid number of said resin being of the order of 200.

4. A resin consisting of an acid inter-esterification product of an hydroxylated oil; an acid selected from the group consisting of citric acid, malic acid, and tartaric acid; and a hydroxy monobasic aliphatic acid, the acid number of said resin being of the order of 200.

5. A resin consisting of an acid inter-esterification product of blown castor oil; an acid selected from the group consisting of citric acid, malic acid, and tartaric acid; and a hydroxy monobasic aliphatic acid, the acid number of said resin being of the order of 200.

6. A resin consisting of an acid inter-esterification product of blown linseed oil; an acid selected from the group consisting of citric acid, malic acid, and tartaric acid; and a hydroxy monobasic aliphatic acid, the acid number of said resin being of the order of 200.

7. A resin consisting of an acid inter-esterification product of an hydroxylated oil; an aliphatic acid selected from the group consisting of citric acid, malic acid, and tartaric acid; and lactic acid, the acid number of said resin being of the order of 200.

8. A resin consisting of an acid inter-esterification product of blown castor oil; an aliphatic acid selected from the group consisting of citric acid, malic acid, and tartaric acid; and lactic acid, the acid number of said resin being of the order of 200.

9. A resin consisting of an acid inter-esterification product of blown linseed oil; an aliphatic acid selected from the group consisting of citric acid, malic acid, and tartaric acid; and lactic acid, the acid number of said resin being of the order of 200.

10. A resin comprising an acid inter-esterification product of blown castor oil, citric acid, and lactic acid, the acid number of said resin being of the order of 200.

11. A resin comprising an acid inter-esterification product of blown linseed oil, citric acid, and lactic acid, the acid number of said resin being of the order of 200.

EDWARD A. LASHER.

REFERENCES CITED

The following references are of record in the file of this patent:

UNITED STATES PATENTS

| Number | Name | Date |
|---|---|---|
| 2,027,467 | Brubaker | Jan. 14, 1936 |
| 1,986,787 | Barrett | Jan. 8, 1935 |
| 1,976,602 | De Groote | Oct. 9, 1934 |
| 1,933,697 | Barrett | Nov. 7, 1933 |
| 1,815,886 | Bruson | July 21, 1931 |
| 1,785,930 | Bradley | Dec. 23, 1930 |
| 2,230,351 | Hill | Feb. 4, 1941 |
| 2,197,269 | Guillandeu | Apr. 16, 1940 |
| 2,344,709 | Lasher | Mar. 21, 1944 |